UNITED STATES PATENT OFFICE.

THOMAS HAWKINS, OF SLATINGTON, PENNSYLVANIA, ASSIGNOR OF ONE-HALF TO CHAUNCEY R. H. REX, OF SLATINGTON, PENNSYLVANIA.

PROCESS FOR THE MANUFACTURE OF EXPLOSIVES.

1,413,532.  Specification of Letters Patent.  Patented Apr. 18, 1922.

No Drawing.  Application filed October 29, 1921. Serial No. 511,477.

*To all whom it may concern:*

Be it known that I, THOMAS HAWKINS, a subject of the King of England, residing at Slatington, in the county of Lehigh and State of Pennsylvania, have invented new and useful Improvements in Processes for the Manufacture of Explosives, of which the following is a specification.

The present invention relates to the production of an explosive material, which in its preferred form is suitable for use as a detonator.

In the preferred form of the invention, metallic mercury is treated with a mixture of nitric and sulfuric acids, the materials, preferably agitated during the ensuing reaction, and when the reaction has ceased or practically ceased, the reaction products are mixed with alcohol (preferably ethyl alcohol) and the reaction products are then separated, the soluble matter from the insoluble matter, the latter being washed and dried at a moderate temperature.

In a preferred form of execution of the processes, one part by measure of metallic mercury is placed in a suitable receptacle and a mixture made from 84 parts by measure of fuming nitric acid (gravity 1.5) 12 parts by measure of concentrated sulfuric acid (gravity 1.84) and 14 parts by measure of water, is then added to said mercury. The materials in the receptacle are stirred or agitated thoroughly at intervals, and when all of the mercury has been reacted upon and there appears in the liquid a white milky appearance, and the reaction has ceased, the temperature is then raised somewhat, preferably to about 125° F., although I do not restrict myself to this precise temperature. This liquid is then poured into another receptacle containing about 80 to 100 parts of alcohol by measure. Ethyl alcohol is preferably used in a relatively pure condition, and this may be at about ordinary room temperature. The mixture is then allowed to stand for the completion of the ensuing reaction, and the solution may be agitated from time to time. When the reaction has ceased, and the white fumes have ceased to be given off, the whole contents are poured into cold water and washed to remove acid. The liquid is then filtered and may be further washed if desired. It is important that all traces of free acid be removed from the material at this stage. The solid material is then dried at a temperature not above the boiling point of water. In the above example, I have referred to the use of fuming nitric acid, concentrated sulfuric acid and water. It is, of course, understood that acids of different strength can be employed, provided that the total amount of actual sulfuric acid and actual nitric acid is the same as represented by the proportions above stated.

The product of the treatment is in a much finer state of subdivision than is ordinary fulminate of mercury made by the ordinary process. The manufacture of the product as above described is also much quicker, much cheaper, and very much safer than the ordinary process used in making fulminate of mercury. The product is also much more powerful than fulminate of mercury. An important further advantage resides in the fact that the process as above described produces a much larger yield of product, than can be obtained by the ordinary methods used in producing fulminate of mercury. The product is perfectly stable and is not affected by moisture and climatic changes and does not deteriorate in storage.

The material produced as above described may be used alone as a detonating or explosive compound, or can, if desired, be mixed with the product produced in the process of my copending application No. 481,007.

I claim—

1. A process of making an explosive compound which comprises reacting upon metallic mercury with a mixture containing nitric acid and sulfuric acid, allowing the reaction to subside, mixing the resulting solution with alcohol, separating the insoluble material from the solution, removing all acid from the residue and drying the latter.

2. A process which comprises reacting on mercury with a nitric and sulfuric acid mixture, reacting on the product with alcohol, separating the soluble matter in the reaction product from the insoluble matter therein, and drying the latter in an acid-free state.

3. A process of making an explosive compound which comprises reacting upon one volume of metallic mercury with a mixture of 84 volumes of 1.5 nitric acid, 12 volumes of 1.84 sulfuric acid and 14 volumes of water, maintaining the materials agitated during the reaction, mixing the resulting product with 80 to 100 volumes of alcohol, separating the insoluble material from the solution, removing all acid from the residue and drying the latter.

4. The herein described product, obtainable by reaction with nitric acid and sulfuric acid on metallic mercury, and reacting on the product with alcohol, the same being finer grained, quicker in its action, safer and more stable, than fulminate of mercury, and being stable against the action of moist air and stable against climatic changes.

In testimony whereof I have affixed my signature.

THOMAS HAWKINS.